United States Patent [19]

French et al.

[11] Patent Number: 4,993,165

[45] Date of Patent: Feb. 19, 1991

[54] METHOD AND APPARATUS FOR DETERMINING NECESSARY SHIM THICKNESS FOR A MARINE PROPULSION DEVICE PINION AND BEARING CARRIER ASSEMBLY

[75] Inventors: Michael G. French, Selma, Ala.; Larry A. Mathis, Lexington, Tenn.

[73] Assignee: Outboard Marine Corporation, Waukegan, Ill.

[21] Appl. No.: 387,196

[22] Filed: Jul. 31, 1989

[51] Int. Cl.$^5$ .......................... G01B 1/00; G01D 2/00
[52] U.S. Cl. ........................................ 33/606; 33/833; 33/517
[58] Field of Search ................. 33/517, 501, 503, 606, 33/549, 833, 832

[56] References Cited

U.S. PATENT DOCUMENTS

| | | | |
|---|---|---|---|
| 2,145,841 | 1/1939 | Walters | 33/606 |
| 3,757,423 | 9/1973 | Wieg | 33/503 |
| 4,037,325 | 7/1977 | Weber | 33/707 |
| 4,096,384 | 6/1978 | Sartorio . | |
| 4,110,611 | 8/1978 | Tann | 33/832 X |
| 4,448,531 | 5/1984 | Seigo . | |
| 4,479,716 | 10/1984 | Nelle . | |
| 4,554,741 | 11/1985 | Affa . | |
| 4,606,642 | 8/1986 | Nelle . | |
| 4,612,709 | 9/1986 | Baisch et al. . | |
| 4,628,609 | 12/1986 | Rieder et al. . | |
| 4,642,900 | 2/1987 | Provost | 33/833 X |
| 4,677,755 | 7/1987 | Iwano | 33/503 |
| 4,684,257 | 8/1987 | Hanaoka et al. . | |
| 4,744,153 | 5/1988 | Brand . | |

*Primary Examiner*—Harry N. Haroian
*Attorney, Agent, or Firm*—Michael, Best & Friedrich

[57] ABSTRACT

An apparatus for use with a device including a housing having a wall surface, and including a pinion and bearing carrier assembly having a first surface and a second surface, and also including a shim or shims located between the first surface and the wall surface, the apparatus determining the required thickness of the shim or shims in order to space the second surface a predetermined distance from the wall surface, the apparatus comprising a frame including a reference point, and a surface adapted to support the second surface of the assembly, a member including a surface adapted to engage the first surface of the assembly, a mechanism for moving the member relative to the frame so as to move the member surface into and out of engagement with the first surface of the assembly, and an arrangement for indicating the location of the member relative to the reference point.

18 Claims, 1 Drawing Sheet

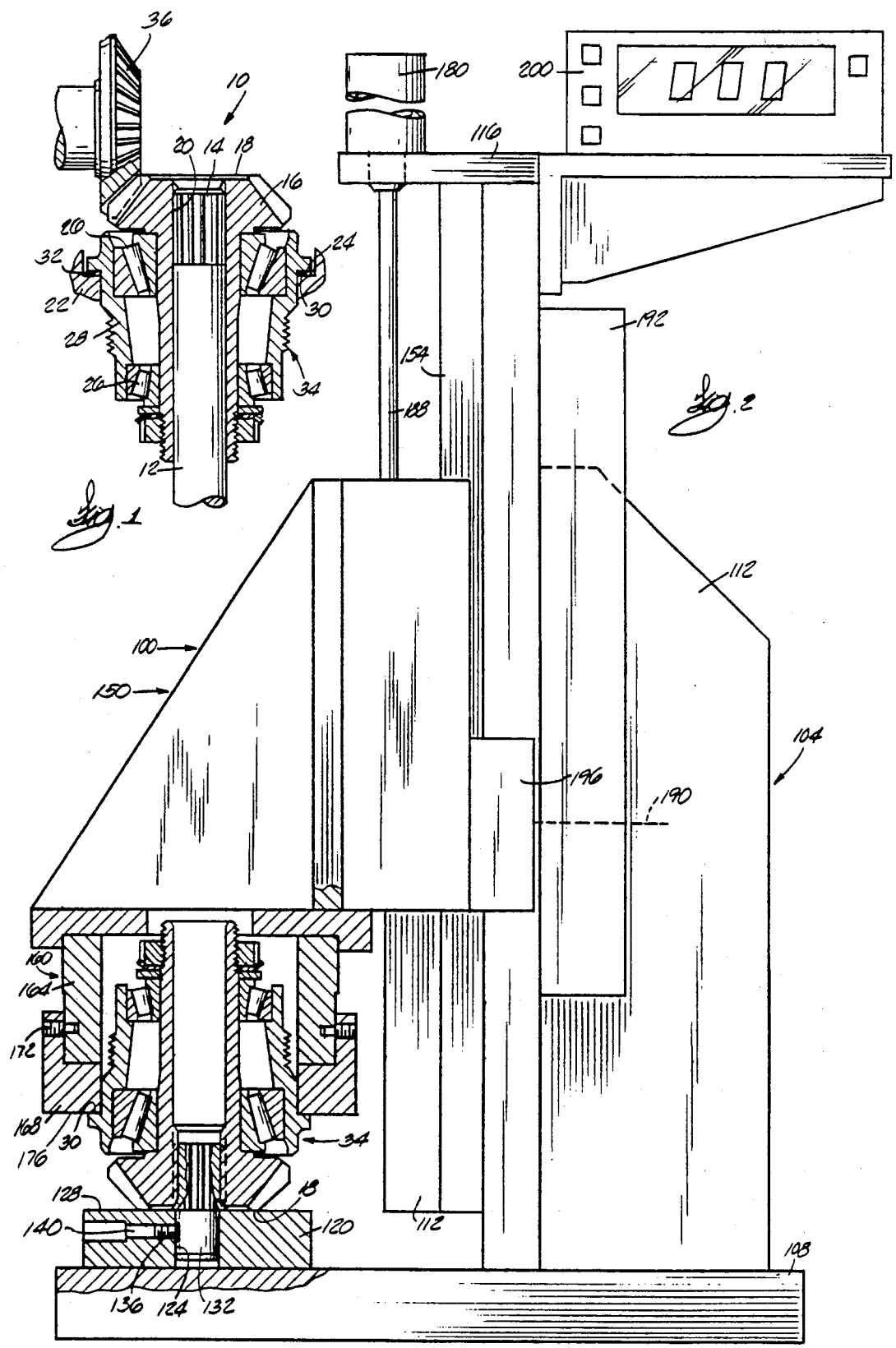

METHOD AND APPARATUS FOR DETERMINING NECESSARY SHIM THICKNESS FOR A MARINE PROPULSION DEVICE PINION AND BEARING CARRIER ASSEMBLY

BACKGROUND OF THE INVENTION

The invention relates to marine propulsion devices, and, more particularly, to the assembly of marine propulsion devices. Still more particularly, the invention relates to methods and apparatus for determining the necessary shim thickness for a marine propulsion device pinion and bearing carrier assembly.

A known marine propulsion device, and more particularly a known stern drive unit, includes a generally vertical drive shaft having a pinion or bevel gear splined or otherwise connected to its upper end. The pinion has a generally planar end surface and is supported by bearings that are in turn supported by a bearing carrier. The bearing carrier is in turn supported by the upper gearcase or housing of the stern drive unit. More particularly, the upper gearcase has therein an annular, generally horizontal, generally planar surface, and the bearing carrier has thereon an annular, generally planar surface spaced from the wall surface by a shim or shims. The pinion end surface must be located a relatively precise distance from the housing wall surface so that the pinion properly meshes with another pinion that is also supported by the housing and that is driven by the engine. The distance between the pinion end surface and the housing wall surface is varied by varying the thickness of the shims between the bearing carrier surface and the housing wall surface.

In the past, the necessary shim thickness has been determined by measuring the distance between the bearing carrier surface and the pinion end surface on a given pinion and bearing carrier assembly and then subtracting the measured distance from the desired distance between the pinion end surface and the housing wall surface. The distance between the pinion end surface and the bearing carrier surface has been measured with a conventional device capable of measuring the distance between two parallel surfaces.

SUMMARY OF THE INVENTION

The invention provides an apparatus for use with a device including a housing having a wall surface, and including a pinion and bearing carrier assembly having a first surface and a second surface, and also including a shim or shims located between the first surface and the wall surface, the apparatus determining the required thickness of the shim or shims in order to space the second surface a predetermined distance from the wall surface, the apparatus comprising a frame including a reference point, and a surface adapted to support the second surface of the assembly, a member including a surface adapted to engage the first surface of the assembly, means for moving the member relative to the frame so as to move the member surface into and out of engagement with the first surface of the assembly, and means for indicating the location of the member relative to the reference point.

The invention also provides a method for use with a device including a housing having a wall surface, and including a pinion and bearing carrier assembly having a first surface and a second surface, and also including a shim or shims located between the first surface and the wall surface, the method determining the required thickness of the shim or shims in order to space the second surface a predetermined distance from the wall surface, the method comprising the steps of providing a master pinion and bearing carrier assembly having a first surface and a second surface, providing a frame including a surface, placing the first surface of the master assembly on the frame surface, establishing on the frame a first reference point indicative of the distance between the frame surface and the second surface of the master assembly, placing the first surface of the test assembly on the frame surface, establishing on the frame a second reference point indicative of the distance between the frame surface and the second surface of the test assembly, and measuring the distance between the first and second reference points.

A principal feature of the invention is the provision of the above-described method and apparatus. The method and apparatus increase quality and decrease cost by providing a simple yet accurate means of determining necessary shim thickness. Additionally, the apparatus can be easily adapted to pinion and bearing carrier assemblies of different sizes simply by replacing the annular member and the drive shaft portion.

Another principal feature of the invention is the use of a portion of an existing part, i.e., a drive shaft, to position the pinion and bearing carrier assembly relative to the frame. Since the driveshaft is already machined to fit the internally splined opening of the pinion, it is not necessary to machine an additional part.

Other features and advantages of the invention will become apparent to those skilled in the art upon review of the following detailed description, claims and drawings.

BRIEF DESCRIPTION OF THE DRAWINGS

FIG. 1 is a partial elevational view, partially in section, of a marine propulsion device comprising a pinion and bearing carrier assembly.

FIG. 2 is a side elevational view of an apparatus embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Partially illustrated in FIG. 1 is a stern drive unit 10 including a generally vertical drive shaft 12 having an externally splined upper end 14. The stern drive unit 10 also includes a pinion or bevel gear 16 having an annular, generally planar upper surface 18 and having therein an internally splined opening 20 receiving the upper end 14 of the drive shaft 12. The stern drive unit 10 also includes an upper gearcase or housing 22 having an annular, generally planar wall surface 24. The pinion 16 is rotatably supported within the housing 22 by a plurality of bearings 26 that are in turn supported by an annular bearing carrier 28. The bearing carrier 28 includes an annular, generally planar, downwardly facing surface 30 spaced from the wall surface 24 by a shim or shims 32. The pinion 16, the bearings 26 and the bearing carrier 28 form a pinion and bearing carrier assembly 34. The stern drive unit 10 also includes a pinion or bevel gear 36 that is driven by an engine (not shown) and that meshes with the pinion 16.

In order to provide proper meshing engagement between the pinions 16 and 36, it is desirable to have the upper surface 18 of the pinion 16 spaced a predetermined distance from the housing wall surface 24. The distance between the pinion surface 18 and the housing wall surface 24 is varied by varying the thickness of the shim or shims 32.

Illustrated in FIG. 2 is an apparatus 100 for determining the required thickness of the shim or shims 32. The apparatus 100 comprises a fixed frame 104 including a base 108, a vertically extending support 112 having a lower end fixed to the base 108, and a horizontally extending support 116 fixed to the upper end of the support 112. The frame 104 also includes a support member 120 which is fixedly secured to the base 108, which has therein a bore 124, and which has a generally planar upper surface 128 adapted to support the pinion surface 18 of a pinion and bearing carrier assembly 34.

The apparatus 100 also comprises means for positioning a pinion and bearing carrier assembly 34 relative to the frame 104. While various suitable means can be employed, in the preferred embodiment, the positioning means includes an externally splined projection 132 which extends upwardly from the support member 120 and which is adapted to be received in the internally splined opening 20 of a pinion and bearing carrier assembly 34. Preferably, the projection 132 is provided by cutting off the upper portion of a vertical drive shaft 12 and by machining a flat 136 on the drive shaft portion 132. The drive shaft portion 132 is inserted into the bore 124 in the support member 120, and a set screw 140 threadedly engages the support member 120 and engages the flat 136 to secure the drive shaft portion 134 relative to the support member 120.

The apparatus 100 also comprises a movable frame 150 supported by the fixed frame 104 for upward and downward movement relative thereto. Preferably, the fixed frame 104 has thereon a Thompson rod bearing 154 that facilitates smooth movement of the movable frame 150 relative to the fixed frame 104 and that maintains alignment of the movable frame 150 relative to the fixed frame 104 and thus relative to the support member 120.

The apparatus 100 also comprises a member 160 fixed to the movable frame 150 for common movement therewith. In the preferred embodiment, the member 160 includes an annular upper portion 164 fixed to the movable frame 150, and an annular lower portion 168 fixed to the upper portion 164. Any suitable means can be used for securing the upper portion 164 to the movable frame 150 and for securing the lower portion 168 to the upper portion 164. Preferably, the upper portion 164 is secured to the movable frame 150 by a plurality of bolts (not shown), and the lower portion 168 is secured to the upper portion 164 by screws 172. The lower portion 168 is preferably made of a hardened tool steel and includes a generally planar, annular lower surface 176 adapted to engage the bearing carrier surface 30 of a pinion and bearing carrier assembly 34.

The apparatus 100 also comprises means for moving the member 160 relative to the fixed frame 104 so as to move the member surface 176 into and out of engagement with the bearing carrier surface 30 of a pinion and bearing carrier assembly 34 supported by the fixed frame 104. While various suitable means can be used, in the illustrated construction, such means includes an air cylinder 180 fixed to the support member 116, a piston (not shown) slideably housed within the air cylinder 180, and a piston rod 188 which is fixed to the piston, which extends downwardly from the cylinder 180 and which is fixed to the movable frame 150. Thus, the piston is fixed to the member 160. The moving means also includes means (not shown) for selectively supplying compressed air to the opposite ends of the cylinder 180 so as to move the piston upwardly and downwardly.

The apparatus 100 also comprises means for indicating the location of the member 160 relative to a reference point 190 on the fixed frame 104. While various suitable means can be employed, in the preferred embodiment such means includes a glass scale 192 which is fixed relative to the fixed frame 104, and which, as will be described hereinafter, has thereon the reference point 190. The indicating means also includes an encoder 196 fixed to the movable frame 150 for common movement therewith. Thus, the encoder 196 is fixed relative to the member 160. As is known in the art, the glass scale 192 has thereon lines or markings that are evenly spaced at a distance of, for example, 0.0005 inch, and the encoder 196 reads or senses the markings with a beam of light. Once the encoder 196 is zeroed on a particular marking, the encoder 196 measures how far it moves along the glass scale 192 by sensing the number of lines or markings it passes during movement relative to the glass scale 192. In the preferred embodiment, the glass scale 192 and the encoder 196 are manufactured by Mitutoyo/MTI Corporation, 18-T Essex Road, Paramus, N.J. 07652, and are sold as a unit as Model AT2-N200.

The indicating means further includes a digital readout 200 operably connected to the encoder 196. In the preferred embodiment, the digital readout 200 is mounted on the support member 116. Preferably, the readout 200 is manufactured by the above-identified Mitutoyo/MTI Corporation and is sold as Model ACL-3705. It should be noted that devices other than the digital readout 200 can be employed for converting the output of the encoder 196 into a visible signal.

The apparatus 100 is used as follows. First, a master pinion and bearing carrier assembly 34 is mounted on the frame 104 with the projection 132 extending into the internally splined opening 20 of the master assembly 34 and with the pinion surface 18 of the master assembly 34 resting on the support member surface 128. Next, the member 160 is moved downwardly until the member lower surface 176 rests on the bearing carrier surface 30 of the master assembly 34. Next, the encoder 196 is zeroed. This establishes on the glass scale 192, and thus on the fixed frame 104, the first reference point or hoizontal plane 190, which is a certain distance from the support member surface 128 or from the pinion surface 18 of the master assembly 34. The first reference point 190 is also a certain distance from the bearing carrier surface 30 of the master assembly 34, because the encoder 196 is fixed relative to the member 160, and the member lower surface 176 rests on the bearing carrier surface 30 of the master assembly 34. Accordingly, the first reference point 190 is indicative of the distance between the support member surface 176 (or the pinion surface 18) and the bearing carrier surface 30 of the master assembly 34. Alternatively stated, zeroing the encoder 196 determines the position of the member 160 relative to the frame 104.

Next, the master assembly 34 is removed from the fixed frame 104 and a test assembly 34 is mounted on the frame 104 in the same manner as the master assembly 34 was mounted on the frame 104. Next, the member 160 is moved downwardly until the lower surface 176 of the member 160 rests on the bearing carrier surface 30 of the test assembly 34. The encoder 196 now establishes on the glass scale 192 a second reference point or horizontal plane (not shown) that is indicative of the distance between the frame surface 128 (or the pinion surface 18 of the test assembly 34) and the bearing carrier surface 30 of the test assembly 34. Alternatively stated, the encoder 196 again determines the position of the member 160 relative to the frame 104. Furthermore, the encoder 196 measures the distance between the first and second reference points, and the digital readout 200 visually displays this distance. This distance is the thickness of the shim or shims 32 that is necessary in order to properly locate the test assembly 34 within the upper gearcase 22 of a stern drive unit 10. A typical shim thickness is 0.014 to 0.017 inch.

Various features of the invention are set forth in the following claims.

We claim:

1. An apparatus for use with a device including a housing having a wall surface, and including a pinion and bearing carrier assembly having a first surface and a second surface, and also including a shim or shims located between the first surface and the wall surface, said apparatus comprising a frame including a reference point, and a surface adapted to support the second surface of the assembly, and means for determining the required thickness of the shim or shims in order to space the second surface a predetermined distance from the wall surface, said means including a member including a surface adapted to engage the first surface of the assembly, means for moving said member relative to said frame so as to move said member surface into and out of engagement with the first surface of the assembly, and means for indicating the location of said member relative to said reference point.

2. An apparatus as set forth in claim 1 wherein the first surface is annular and generally planar, and wherein said member surface is annular and generally planar.

3. An apparatus as set forth in claim 1 wherein said member is annular, and wherein said moving means moves said member into surrounding relation relative to the assembly when said member surface moves into engagement with the first surface of the assembly.

4. An apparatus set forth in claim 1 and further comprising means for positioning the assembly relative to said frame.

5. An apparatus for use with a device including a housing having a wall surface, and including a pinion and bearing carrier assembly having a first surface and a second surface and having therein an internally splined opening, and also including a shim or shims located between the first surface and the wall surface, said apparatus determining the required thickness of the shim or shims in order to space the second surface a predetermined distance from the wall surface, said apparatus comprising a frame including a reference point, and a surface adapted to support the second surface of the assembly, a member including a surface adapted to engage the first surface of the assembly, means for moving said member relative to said frame so as to move said member surface into and out of engagement with the first surface of the assembly, means for indicating the location of said member relative to said reference point, and means for positioning the assembly relative to said frame, said positioning means including an externally splined projection which extends from said frame and which is adapted to be received in the internally splined opening.

6. An apparatus as set forth in claim 1 wherein said moving means includes a cylinder fixed to one of said member and said frame, and a piston rod fixed to the other of said member and said frame.

7. An apparatus as set forth in claim 6 wherein said cylinder is fixed to said frame and said piston rod is fixed to said member.

8. An apparatus as set forth in claim 1 wherein said indicating means includes a glass scale fixed relative to one of said member and said frame, and an encoder fixed relative to the other of said member and said frame.

9. An apparatus as set forth in claim 8 wherein said indicating means also includes a readout operably connected to said encoder.

10. An apparatus as set forth in claim 8 wherein said glass scale is fixed relative to said frame and said encoder is fixed relative to said member.

11. A method for use with a device including a housing having a wall surface, and including a pinion and bearing carrier assembly having a first surface and a second surface, and also including a shim or shims located between the first surface and the wall surface, said method determining the required thickness of the shim or shims in order to space the second surface a predetermined distance from the wall surface, said method comprising the steps of providing a master pinion and bearing carrier assembly having a first surface and a second surface, providing a frame including a surface, placing the first surface of the master assembly on said frame surface, establishing on said frame a first reference point indicative of the distance between said frame surface and the second surface of the master assembly, placing the first surface of the test assembly on said frame surface, establishing on said frame a second reference point indicative of the distance between said frame surface and the second surface of the test assembly, and measuring the distance between said first and second reference points.

12. A method as set forth in claim 11 and further comprising the step of providing a member which includes a surface adapted to engage the first surfaces of the test and master assemblies and which is movable relative to said frame, wherein said first-mentioned establishing step is performed by moving said member relative to said frame so as to move said member surface into engagement with the first surface of the master assembly and then determining the position of said member relative to said frame, and wherein said second-mentioned establishing step is performed by moving said member relative to said frame so as to move said member surface into engagement with the first surface of the test assembly and then determining the position of said member relative to said frame.

13. A method as set forth in claim 11 wherein said method further comprises the step of providing means for positioning the assemblies relative to said frame.

14. A method as set forth in claim 13 wherein each of the assemblies has therein an internally splined opening, and wherein said step of providing means for positioning the assemblies includes the steps of providing a drive shaft having an externally splined end adapted to be received in the internally splined opening of a pinion and bearing carrier assembly, cutting off a portion of said drive shaft having thereon said externally splined end, and securing said drive shaft portion to said frame.

15. An apparatus for use with a device including a housing having a wall surface, and including a pinion and bearing carrier assembly having an annular, generally planar first surface and a second surface and having therein an internally splined opening, and also including a shim or shims located between the first surface and the wall surface, said apparatus determining the required thickness of the shim or shims in order to space the second surface a predetermined distance from the wall surface, said apparatus comprising a frame including a reference point, a surface adapted to support the second surface of the assembly, and an externally splined projection which extends from said frame and which is adapted to be received in the internally splined opening, an annular member including an annular, generally planar surface adapted to engage the first surface of the assembly, means for moving said member relative to said frame so as to move said member surface into and out of engagement with the first surface of the assembly, said moving means including a cylinder fixed to one of said member and said frame, and a piston rod fixed to the other of said member and said frame, and means for indicating the location of said member relative to said reference point, said indicating means including a glass scale fixed relative to one of said member and said frame, and an encoder fixed relative to the other of said member and said frame.

16. An apparatus as set forth in claim 15 wherein said cylinder is fixed to said frame and said piston rod is fixed to said member.

17. An apparatus as set forth in claim 15 wherein said indicating means also includes a readout operably connected to said encoder.

18. An apparatus as set forth in claim 15 wherein said glass scale is fixed relative to said frame and said encoder is fixed relative to said member.

* * * * *